(12) United States Patent
Hedström

(10) Patent No.: US 7,446,267 B2
(45) Date of Patent: Nov. 4, 2008

(54) CABLE TRANSIT DEVICE

(75) Inventor: Hans Hedström, Stockholm (SE)

(73) Assignee: Roxtec AB, Karlskrona (SE)

( * ) Notice: Subject to any disclaimer, the term of this patent is extended or adjusted under 35 U.S.C. 154(b) by 0 days.

(21) Appl. No.: 10/861,352

(22) Filed: Jun. 7, 2004

(65) Prior Publication Data

US 2005/0121217 A1    Jun. 9, 2005

(30) Foreign Application Priority Data

Dec. 14, 2001    (SE)    .................... 0104223

(51) Int. Cl.
*H02G 3/18*    (2006.01)

(52) U.S. Cl. .................. 174/650; 174/656; 174/659; 174/77 R; 174/151; 277/602

(58) Field of Classification Search ............... 174/65 G, 174/65 SS, 77 R, 151, 152 G, 153 G, 650, 174/652, 656, 658, 659, 664, 668; 277/602–604, 277/606–610, 627, 944
See application file for complete search history.

(56) References Cited

U.S. PATENT DOCUMENTS

| | | | | |
|---|---|---|---|---|
| 1,851,940 A | * | 3/1932 | Williams ................ | 174/152 G |
| 3,244,802 A | * | 4/1966 | Sturtevant et al. ........ | 174/153 G |
| 3,424,857 A | * | 1/1969 | Kipp et al. ............. | 174/153 G |
| 3,775,204 A | | 11/1973 | Thompson et al. | |
| 4,179,319 A | * | 12/1979 | Lofdahl ................ | 174/151 |
| 4,267,401 A | * | 5/1981 | Wilkinson .............. | 174/151 |
| 4,622,436 A | * | 11/1986 | Kinnan ................. | 277/606 |
| 5,408,740 A | * | 4/1995 | Dee .................... | 174/650 |
| 5,442,140 A | * | 8/1995 | Mc Grane .............. | 174/151 |
| 5,836,048 A | * | 11/1998 | Rossman et al. ......... | 174/153 G |
| 5,939,676 A | * | 8/1999 | Birmingham et al. ...... | 174/656 |
| 6,107,571 A | * | 8/2000 | Damm .................. | 174/77 R |
| 6,107,574 A | * | 8/2000 | Chang et al. ........... | 174/77 R |
| 6,118,076 A | * | 9/2000 | Damm et al. ............ | 174/77 R |
| 6,150,608 A | * | 11/2000 | Wambeke et al. ......... | 174/65 G |
| 6,280,220 B1 | * | 8/2001 | Horner ................. | 174/153 G |
| 6,348,657 B1 | * | 2/2002 | Haslock et al. .......... | 174/659 |
| 6,351,592 B1 | * | 2/2002 | Ehn et al. .............. | 174/668 |
| 6,438,828 B1 | * | 8/2002 | Uchiyama .............. | 174/152 G |
| 6,521,840 B1 | * | 2/2003 | Kreutz ................. | 174/151 |
| 6,768,058 B2 | * | 7/2004 | Pallapothu ............. | 174/151 |

FOREIGN PATENT DOCUMENTS

| | | |
|---|---|---|
| DE | 3739714 | 2/1989 |
| DE | 4028570 | 3/1992 |
| DE | 19526877 | 11/1996 |
| DE | 29908044 | 9/1999 |
| EP | 0 052 090 | 5/1982 |
| WO | WO 1028057 | 4/2001 |

* cited by examiner

*Primary Examiner*—Dhiru R. Patel

(57) ABSTRACT

A transit device is disclosed for passing at least one elongate line sealingly through an opening in a wall. The device comprises a clamping frame and a number of blocks which together fill-out the frame. At least one of the blocks has a through-penetrating channel for receiving the line, wherein the block is adapted to permit lateral insertion of the line into the channel. The device also comprises a separate tubular bush made of elastic material. The bush has a generally axial through-penetrating slot in its wall, to enable the bush to be laterally fitted to the line, and has an outer cross-section which corresponds generally to the cross-section of the channel in the block. The bush comprises a plurality of radially separated layers which can be separated from each other so as to adapt the through-penetrating channel of the bush to the line.

10 Claims, 2 Drawing Sheets

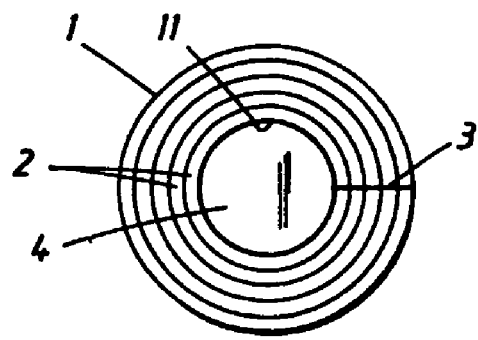
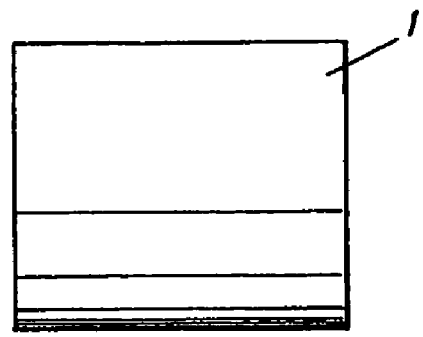
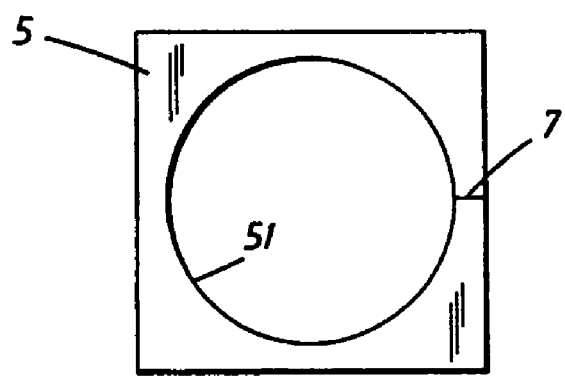
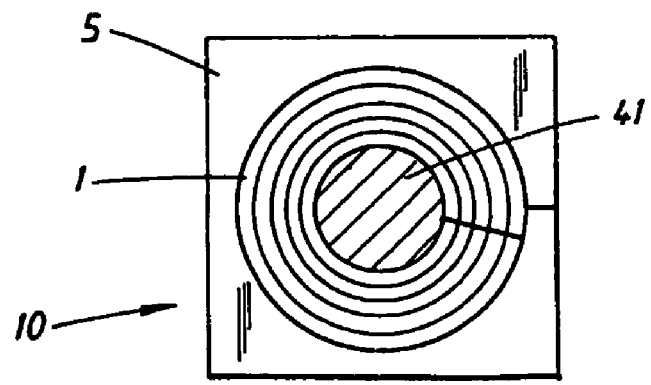

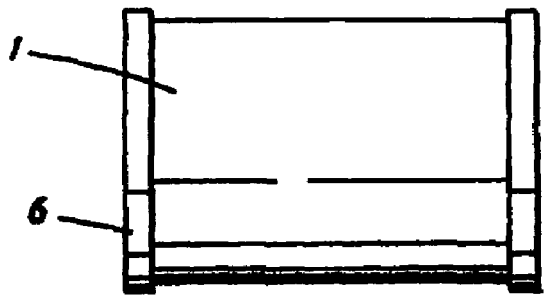
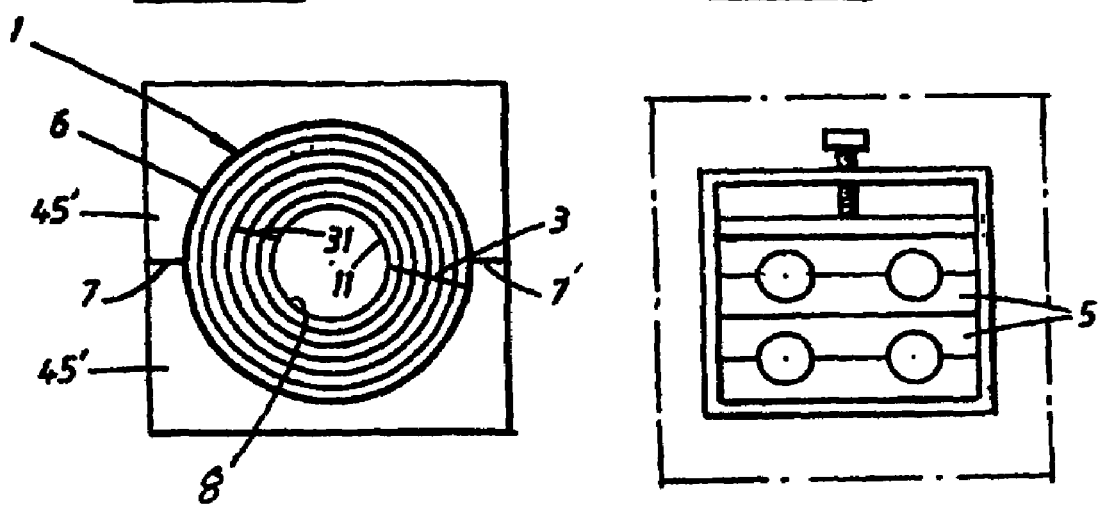
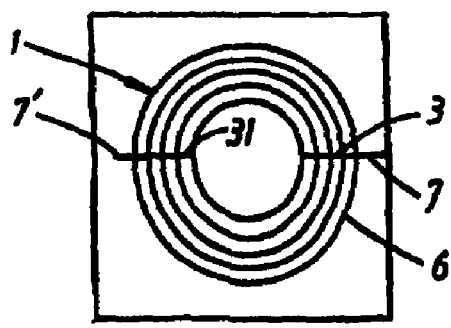

CABLE TRANSIT DEVICE

BACKGROUND OF THE INVENTION

1. Field of the Invention

The present invention relates to a transit device of the kind defined in the preamble of claim 1.

Thus, the invention is concerned with a transit device which sealingly shields a wall opening through which one or more lines extend.

By line is meant an elongate object, such as a cable, a pipe, tubing or the like.

2. Description of Prior Art

Known transit devices generally include a clamping frame sealingly connected to a wall around a wall opening.

The clamping frame receives elastic blocks which together substantially fill-out the frame. At least one block has at least one through-penetrating channel and is divided to enable the channel to be exposed and therewith allow the block to be opened and fitted to the line.

The channel is normally shielded initially by a plug that fits into the channel. The frame also seals against the blocks, when said blocks fill-out the flame and when the frame is tensioned or tightened to compress the blocks and therewith eliminate any gaps between and within the blocks.

A block of this kind known in practice (WO 01/28057) is comprised, in connection with the channel, of radially, mutually sequential separable layers of material. By tearing or peeling off one or more of these layers, the channel can be made correspondingly larger so as to fit the outer diameter of the line concerned.

One drawback with this known solution is that the line-adapted block does not stay on the line prior to or subsequent to fitting the block in the clamping frame. If the line-adapted block goes astray among other blocks, the block can be considered to be lost, therewith necessitating the arrangement of a fresh block if the cable is to be sealingly connected in the transit.

It is also known that the line can be wrapped in a band of rectangular cross-sectional profile, wherewith numerous turns of the band are wound around the line in tight axial abutment with each other to form a bush, whereafter the thus formed bush is received sealingly in a through-penetrating channel in the divided block. However, it is necessary in principle to have available a band for each line dimension, or it is necessary to provide blocks that include a large number of different channel diameters. The line wrapping technique is labour consuming.

Divided blocks whose channel defining sides are formed by tearing or peeling away layers (WO 01/28057) or adding layers (U.S. Des. Pat. No. 401223), have certain advantages; the block can be readily adapted to lines of different diameters by peeling off or adding layers, the blocks have a standard outer diameter which is well adapted to respective clamping frames and when the adapted block is fitted to the cable an operator is able to see whether or not gaps are present between the blocks or between the cable and the channel walls of the block, prior to tightening the frame.

DE 4028570 A teaches a transit device comprising separate bushes that have an axial slot through the wall, wherein the bush wall is comprised of concentric layers that can be torn loose from one another so as to adapt the through-penetrating channel of the bush to the size of the cable concerned

SUMMARY OF THE INVENTION

One object of the invention is to provide a transit device with which said advantages can be retained and with which the aforesaid drawbacks can be avoided and with which other advantages can be achieved. A further object is to provide a bush that can be opened more readily.

These objects are achieved with the inventive transit device.

The invention is defined in the accompanying Claim 1.

Further embodiments of the invention are set forth in the accompanying dependent Claims.

An important feature of the invention is that the blocks can be produced in a unitary size, both with respect to outer contours and with respect to their respective through-penetrating channels. According to the invention, separate tubular elements are produced from the blocks in the form of bushes of unitary outer diameter adapted to the through-penetrating channel of the blocks. The bushes normally include a removable centre plug and have a generally axial slot through their respective walls, wherewith the slot can be readily opened so as to enable the bush to be fitted laterally to and removed laterally from the line concerned. The actual bush is made so that it will have a so-called memory facility, which causes the slot to close so that the bush will remain on the line after being fitted. The bush is comprised of at least two radially separate or separable layers of material, which enable the size of the through-penetrating channel of the bush to be adapted to the outer diameter of the line concerned. To facilitate opening of the axial slot in the bush, the inner wall of said bush may include an additional slot, which, however, may not be penetrating but shall leave on the bush a radially outer portion that serves to bias the bush towards its closed state.

The axially through-penetrating slot that enables the bush to be opened, enables adaptation of the size of the bush hole to be controlled with regard to the line concerned; when the bush has been fitted onto and tightly embraces the line, the slot will only just close.

The bush may be provided at its ends with radial projections or circumferential fins or the like so as to guard against displacement of the bush out through the through-penetrating channel of the block, wherein said projections or fins may conveniently function to hold the bush and the block together axially in the clamping frame prior to or subsequent to fitting the frame.

The bush may be a separate component which is fitted separately to the line and which is adapted to said line by removing or peeling away radially inner bush wall layers so as to adapt the bush to the line concerned. Because the bush is biased towards a slot-closing state, the bush will remain on the line. When the block is divided into two halves and has a standardised outer contour and the size of the openings forming the through-penetrating channel, whose diameter corresponds to the outer diameter of the bush, is standard, no harm will be done if a block or a block half loosens from the bush in conjunction with a cable being inserted into the bush and the block in the transit device, since the operator is able to grip any one of the accessible block halves and therewith orientate the block around the bush.

According to one embodiment of the invention, the block may have a single through-penetrating slot or slit that extends between the outer and inner walls of the through-penetrating channel, wherewith the slot can be widened by opening said slot, therewith elastically deforming the opposite wall portion of the block. If the bending resistance of the deformation part is troublesomely high, a slit/slot can be cut to a restricted depth from the surface of the through-penetrating channel towards the outer wall of the block, wherewith the remaining part of the outer wall forms a restoring spring which functions to close the slot/slots in the block.

BRIEF DESCRIPTION OF THE DRAWINGS

The invention will now be described by way of example with reference to the accompanying drawings.

FIGS. 1a and 1b are respectively an end view and a side view of a bush.

FIG. 2 is an end view of a block which is intended to receive the bush according to FIGS. 1a, 1b.

FIG. 3 illustrates the block of FIG. 2 with a bush according to FIGS. 1a, 1b inserted therein.

FIG. 4 is a side view of a bush variant.

FIG. 5 illustrates a modified bush inserted in a conventional two-part block.

FIG. 6 illustrates a clamping frame filled with blocks.

FIG. 7 illustrates a further embodiment of a block and a bush accommodated therein.

DETAILED DESCRIPTION OF PREFERRED EMBODIMENTS

When lines shall extend between mutually adjacent spaces that are separated by a wall, through an opening in the wall, it is conventional to fit a clamping frame 11, normally a clamping frame that includes a rectangular opening, in connection with the wall opening. A number of blocks 5 can be fitted into the clamping frame. Each such block is tubular and can be opened to tightly embrace an associated line, for instance a cable 41. Alternatively, the block may include a sealing plug 4. The blocks shield the area between the lines and the clamping frame members. The blocks present in the clamping frame can be compressed and therewith elastically deformed by displacing at least one of the side members of the frame, therewith positively sealing the blocks against each other and against the side members of the frame or against the plugs 4 or the lines 41. The frame 11 is tightly connected to the wall surfaces around the wall opening.

According to the invention, the transit device comprises a block unit 10 that includes a generally orthogonal parallelepipedic block 5 of square cross-section and a circular-cylindrical through-penetrating channel 51. A slot 7 extends from the surface of the wall of the channel 51 to the surface of an outer wall of the block. The block 5 is comprised of an elastomeric material, thereby enabling the slot 7 to be widened, for instance manually, so that a line can be inserted laterally through the opened slot 7 and into the channel 51.

Located in the channel 51 is a bush 1 whose outer diameter corresponds to the diameter of the channel 51. The illustrated bush 1 is comprised of a number of concentric layers 2. The bush wall includes a slot 3 that extends from the through-penetrating channel of the bush to the outer surface of the bush. A plug 4 is sealingly accommodated in the through-penetrating channel of the bush. This plug is removed. The bush 1 is generally comprised of an elastomeric material and the slot 3 can be widened to enable a line to be fitted laterally into the channel. The through-penetrating channel of the bush 1 can be adapted to the line concerned, by removing one or more bush layers 2 from the inner wall surface of said bush and therewith widen the channel. When the bush has been given an inner through-penetrating channel of the appropriate diameter, the bush should sealingly embrace the line and the slot 3 should be closed.

The bush 1 is a separate, individual unit. The material from which the bush is made has a memory property such as to cause the bush to close and embrace the line when fitted thereto and thus be retained on the line. The block 5 can be fitted to the line in a position that is axially spaced from the position of the bush 1 on said line, whereafter the bush and the block 5 can be moved axially so that the block 5 will surround the bush 1 in an appropriate axial position along the line.

The bush layers 2 may be separate from each other or may be stuck together or otherwise affixed to each other, although the layers will be capable of being separated from one another under all circumstances.

The bush 1 and the block 5 shown in FIG. 2 both have a tendency to remain on the line, both before and after the block unit 10 comprised of the block and the bush have been mounted in the clamping frame.

The bush 1 has an axial length which is slightly greater than the axial length of the block 5, and the bush 1 may include at the ends of its barrel surface projections, for instance fins 6, which prevent axial displacement of the bush 1 out through the block 5.

FIG. 5 shows the bush of FIGS. 1a, 1b accommodated in an alternative block that comprises two mutually identical shell halves 45', which define therebetween a bush-receiving through-penetrating channel 51.

It will also be seen from FIG. 5 that the bush 1 may include a blind slot 31 extending from its inner wall 8. The slot 31 may lie in the same axial plane as the through-penetrating slots 3 and functions to reduce resistance to lateral opening of the bush.

The line 41 may consist of tubing, piping, an electric cable or any elongate object in general.

The slot 3, 31, 7 of the bush 1 and the block 5 may lie in a common plane when the bush 1 is fitted in the block, particularly when the block has the design shown in FIG. 2, with solely one radial through-penetrating wall slot 7 (and possibly a further non-penetrating wall slot, preferably in a region that is roughly diametrical to the through-penetrating wall slot.) The non-penetrating or blind wall slot 7' then extends radially outwards from the channel 51.

As will be seen from FIG. 5, the additional slot 31 in the bush may lie in the same plane as the slot 3. The slot 31 extends through a large portion of the wall thickness of the bush such as to enable the bush to be readily opened for lateral fitting of a cable/line, while the remaining part of the bush material outside the blind slot 31 provides an elastic restoring force sufficient to close the bush 3 around the cable/line. By allowing the additional slot to extend through a relatively large part of the wall thickness of the bush, the shear stresses between the bush layers are reduced when opening the bush to laterally fit a cable/line or the like, thereby reducing the risk of the bush layers releasing from each other.

When the block includes a through-penetrating wall slot 7 and a non-penetrating wall slot 7', and when the through-penetrating slot 3 of the bush is directed generally to the through-penetrating wall slot 7 of the block, it is possible to open the block and the bush, when the latter is situated in the block, to enable the insertion of a cable or the like through the through-penetrating wall slots 7, 3, provided, of course, that the through-penetrating opening of the bush has earlier been adapted to the diameter of the line.

The invention claimed is:

1. A transit device for passing at least one elongate line through an opening in a wall, comprising:

a clamping frame and a number of blocks which together fill-out the frame, wherein at least one of the blocks has a through-penetrating channel for receiving the line, wherein the block is adapted to permit lateral insertion of the line into the channel;

a separate tubular bush made of elastic material, wherein the wall of the bush has a generally axial through-penetrating slot to enable said bush to be fitted laterally onto the line, wherein the bush has an outer cross-section that corresponds essentially to the cross-section of the channel in the block, and wherein the bush comprises a plurality of radially separated layers which can be separated from each other so as to adapt the through-penetrating channel of the bush to the line, wherein the bush has a non-penetrating wall slot extending from an inner wall of said bush.

2. A transit device according to claim 1, wherein said non-penetrating slot is located in a region diametrically opposite the through-penetrating wall slot of said bush.

3. A transit device according to claim 1, wherein the bush has a shape memory with respect to closure of the through-penetrating slot of said bush.

4. A transit device according to claim 1, wherein the length of the bush is greater than the length of the through-penetrating channel of the block, and the bush has at least at one end a projection which projects radially outwards beyond the barrel surface of the bush, such as to restrict axial movement of the bush away from the block.

5. A transit device according to claim 4, wherein the bush has at least one radial projection at each of its ends, said projections preferably having the form of fins.

6. A transit device according to claim 1, wherein the block comprises a generally axial slot which extends from the through-penetrating channel of the block to the outside of said block and enables the block to be opened for lateral insertion of the line and/or the bush.

7. A transit device according to claim 6, wherein the block includes a further slot which extends through a limited distance from the surface of the through-penetrating channel in a direction towards the outer wall of the block.

8. A transit device according to claim 1, wherein the through-penetrating channel of the block and the outer barrel surface of the bush are circular-cylindrical in shape.

9. A transit device according to claim 1, wherein the block is comprised of two separate parts.

10. A transit device according to claim 1, wherein the block is comprised of an elastomeric material.

* * * * *